United States Patent [19]

Johnson

[11] 4,196,588

[45] Apr. 8, 1980

[54] MARGIN VALVE

[75] Inventor: Howard L. Johnson, Joliet, Ill.

[73] Assignee: Caterpillar Tractor Co., Peoria, Ill.

[21] Appl. No.: 901,409

[22] Filed: May 1, 1978

[51] Int. Cl.[2] .......... F16H 39/46

[52] U.S. Cl. .......... 60/445; 60/452; 137/535; 251/324

[58] Field of Search .......... 60/445, 448, 452; 137/488, 528, 535; 251/62, 324

[56] References Cited

U.S. PATENT DOCUMENTS

| | | | |
|---|---|---|---|
| 2,713,772 | 7/1955 | Horlacher | 60/452 X |
| 3,260,273 | 7/1966 | Hayner | 137/85 |
| 3,484,960 | 12/1969 | Kokaly et al. | 37/8 |
| 3,543,508 | 12/1970 | Schwab | 60/445 X |
| 3,830,594 | 8/1974 | Hein et al. | 91/499 |
| 3,898,807 | 8/1975 | Habiger | 60/445 X |
| 3,987,622 | 10/1976 | Johnson | 60/420 |
| 4,028,890 | 6/1977 | Habiger et al. | 60/445 X |
| 4,074,529 | 2/1978 | Budzich | 60/452 X |

*Primary Examiner*—Edgar W. Geoghegan
*Attorney, Agent, or Firm*—Wegner, Stellman, McCord, Wiles & Wood

[57] ABSTRACT

A supply or demand margin valve for use in hydraulic systems having at least one load provided with hydraulic fluid under pressure by a main pump, a pilot pump and at least one control valve for the load. The margin valve includes a valve body having a bore with a spool reciprocally received within the bore. A first port in the body extends to the bore and is adapted to be connected to the pilot pump. A second port in the body extends to the bore and spaced in relation to the first port and is adapted to be connected to a component of a hydraulic system other than a pilot pump. A spring is disposed in the valve body for applying a biasing force to the spool to urge the spool in one direction and a third port is in fluid communication with the pressure responsive surface and is adapted to be connected to a main pump so as to apply a force to the spool to urge the spool in the same direction as the spring. A fourth port connects with a pressure responsive surface for applying a force to the spool in bucking relation to the spring and a feedback passage in connection with an additional pressure responsive surface is in fluid communication with the second port for applying an additional force to the spool in bucking relation to the spring.

21 Claims, 5 Drawing Figures

MARGIN VALVE

BACKGROUND OF THE INVENTION

This invention relates to hydraulic valves, and, more particularly, valves for use as margin valves in hydraulic systems.

Many hydraulic systems in use today employ flow and pressure compensated pumps and operate on a so-called "load plus" basis. In such systems, the pump is controlled to provide an output pressure that is equal to that required by the load plus some predetermined additional pressure increment commonly known as "margin".

In order to provide the margin, the systems have utilized so-called margin valves which typically had pump discharge pressure applied to one end of a spool and the load pressure plus a spring force applied to the other end of the spool for controlling a pilot signal to the pump control. In such systems, the spring force utilized was responsible for providing the margin.

In any event, such prior art margin valves had tended to be unstable in that load signals would cause the spool to overshift and, typically, would result in some period of oscillation of the spool. This, in turn, would result in a pilot signal of varying magnitude being applied to the pump control with the further consequence that the pump output pressure would vary in an oscillating manner, making it difficult to exercise fine control over the load.

SUMMARY OF THE INVENTION

The present invention is directed to overcoming one or more of the above problems.

According to one facet of the invention, there is provided a margin valve for use in a hydraulic system either as a supply margin valve or as a demand margin valve. The valve includes a valve body having a bore and a spool which is reciprocally received within the bore. A first port is disposed in the body and extends to the bore and is adapted to be connected to a pilot pump. A second port is located in the body and extends to the bore and spaced in relation to the first port and is adapted to be connected to a component of a hydraulic system other than a pilot pump. A margin establishing means is located within the body. Means, including a third port in said body adapted to be connected to a main pump, are provided for creating a force tending to urge the spool in one direction within the bore. Means, including a fourth port in the body adapted to be connected to a load, are provided for creating an additional force tending to urge the spool within the bore to eliminate valve instability.

When the invention is employed as a supply margin valve, the variable pressure output is used to control the displacement of a variable displacement pump.

When the valve is used as a demand margin valve, the variable pressure output is used to control or limit the displacement of the valve stems of one or more directional control valves.

In either case, when the difference between pump pressure and the load pressure falls below an established margin, the variable pressure output is reduced.

According to another facet of the invention, there is provided a valve having a valve body including a spool bore opening on at least one end of the body. A spool is received within the spool bore and has a tapered end. Ports are located in the body and extend to the spool bore and a chamber is located in the body and has an opening on at least one side of the body and further intersects the spool bore. A piston bore is disposed in the body generally parallel to the spool bore and opens to the chamber. A shoulder having an aperture receiving the spool is disposed within the chamber and has a portion aligned with the piston bore. The shoulder is sized to be introduced into the chamber through the opening. A snap ring secures the shoulder on the spool and is introduced onto the spool at the tapered end thereof. A piston is located in the piston bore to abut the shoulder and separate means are provided for directing fluid to the tapered end and to the piston.

According to another facet of the invention, there is provided a valve including a valve body having a bore along with port means in the body extending to the bore. A spool is slidably received in the bore and a stepped bore is located in the body generally coaxial with the first mentioned bore. A stepped piston is disposed within the stepped bore and engages an end of the spool. A first conduit in the body is connected to one diameter of the stepped bore and a second conduit is connected to another diameter of the stepped bore.

Other objects and advantages will become apparent from the following specification taken in connection with the accompanying drawings.

DESCRIPTION OF THE PREFERRED EMBODIMENTS

Figure 1:
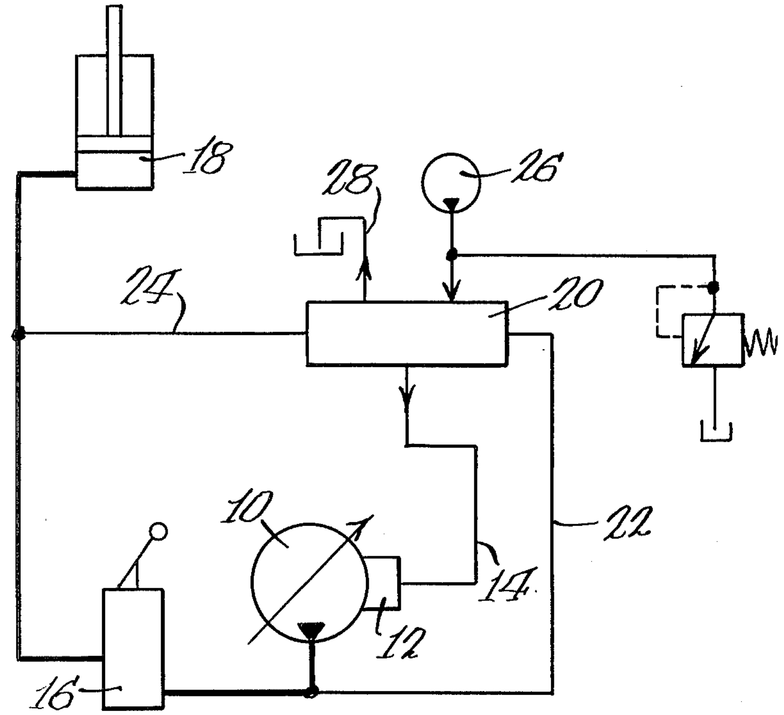
FIG. 1 is a schematic of a hydraulic system embodying a valve made according to the invention as a supply margin valve.

A typical, but highly simplified, hydraulic circuit which may embody a valve made according to the present invention as a so-called supply margin valve, is illustrated in FIG. 1 and is seen to include a flow and pressure compensated hydraulic pump 10 having a control 12, both of conventional construction. The control 12 is adapted to receive a hydraulic signal through a line 14 and is of the type that will increase pump output pressure in response to a decreasing pilot signal. The output of the pump 10 is connected to a control valve 16 from whence it may be selectively directed to a load in the form of a hydraulic cylinder 18.

A supply margin valve 20 made according to the invention whose construction will be described in greater detail hereinafter, includes an input through a line 22 connected to the output of the pump 10 as well as an input through a line 24 connected to the junction of the control valve 16 and the cylinder 18. The line 22 provides a pump or discharge signal while the line 24 provides a load signal.

A pilot pump 26 is connected to a port on the valve 20 while an additional port is connected by a line 28 to the hydraulic reservoir. The line 14 is also connected to a port on the valve 20 and the arrangement is such that the pressure signal from the pilot pump 26 will be modulated by the valve 20 to provide a signal in the line 14 to the control 12 to maintain the desired margin between the pressures in the lines 22 and 24 to provide so-called load plus operation.

Figure 2:
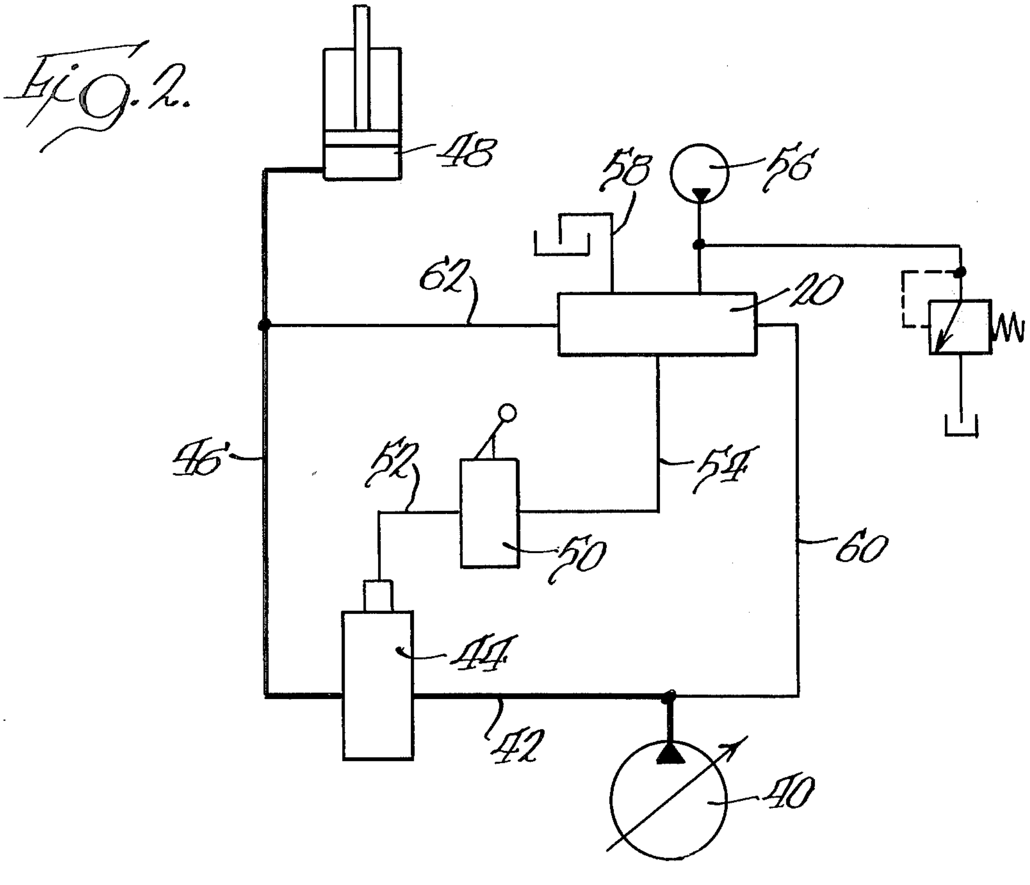
FIG. 2 is a schematic of a hydraulic system embodying a valve made according to the invention as a demand margin valve.

FIG. 2 illustrates the use of the valve in a hydraulic system as a demand margin valve. In such a system, the valve function is described in considerable detail in the commonly assigned U.S. Pat. No. 3,987,622 issued to Howard L. Johnson, entitled "Load Controlled Fluid System Having Parallel Work Elements", issued Oct. 26, 1976, the details of which are herein incorporated by reference. The system includes a main pump 40 which may be of fixed or variable displacement and which has an output connected by a line 42 to a pilot operated control valve 44 which controls the passage of fluid from the line 42 to a line 46 connected to a load such as a cylinder 48. The system further includes a manually operated pilot valve 50 connected by a line 52 to the end chamber of the valve 44, and by a line 54 to an outlet port on a valve 20 made according to the invention. The valve 20 includes an input from a pilot pump 56 and an output on a line 58 to drain.

A line 60 provides a pump signal to the valve 20 and a line 62 provides a load signal to the valve 20.

When used in a demand margin capacity, the valve 20 is normally wide open, but will sense a decrease in the normal difference between the pressure provided by the pump 40 and that demanded by the load 48 as signaled through the lines 60 and 62 and decrease the pressure level in the line 54 to the pilot valve 50 and thence to the end chamber of the pilot operated valve 44, thereby causing the latter to throttle flow from the pump 40 to the load 48 so that the capacity of the pump 40 is not exceeded.

It is to be understood that while FIG. 1 illustrates the use of the valve 20 solely in a supply margin capacity, and while FIG. 2 illustrates the use of the valve 20 solely in a demand margin capacity, two such valves may be employed in a single system utilizing both supply margin and demand margin features such as that disclosed in the previously identified patent of Johnson.

It is also to be understood that while the circuits illustrated in FIGS. 1 and 2 illustrate but a single load in each system, plural loads are contemplated and it is further contemplated that the loads can be of a nature other than the single-acting cylinders 18 and 48 illustrated as, for example, double-acting cylinders, rotary output hydraulic motors, etc. In this connection, reference may be had to the previously identified Johnson Patent for the details of incorporation of supply and demand margin valves in multiple load applications of varying types.

Figure 3:
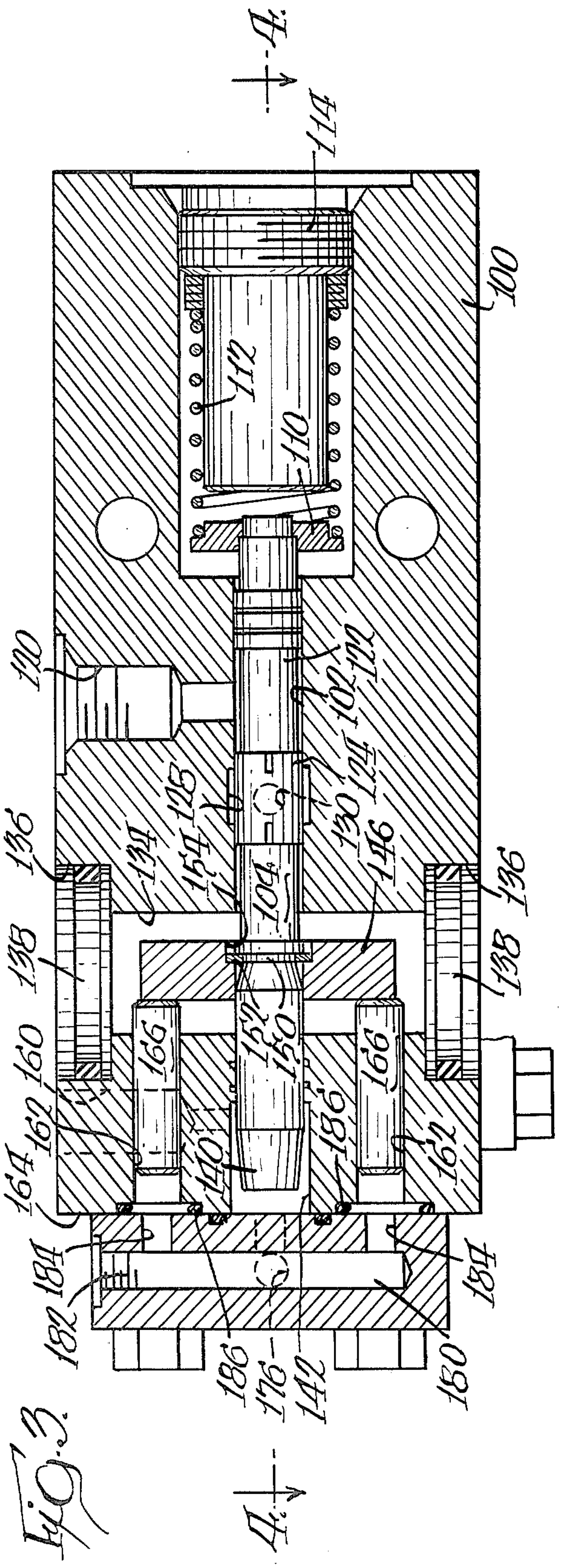
FIG. 3 is a sectional view of a highly preferred form of a valve made according to the invention.
Figure 4:
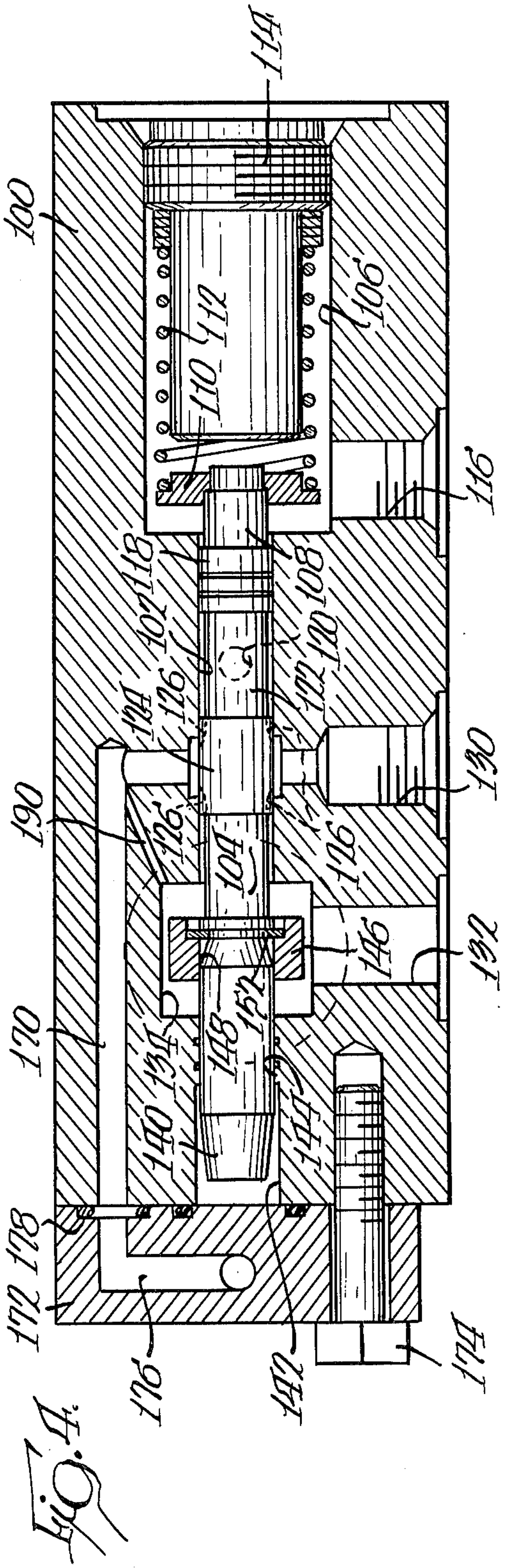
FIG. 4 is a sectional view taken approximately along the line 4—4 in FIG. 3.

Turning now to FIGS. 3 and 4, a highly preferred embodiment of the valve 20 is illustrated. The same includes a valve body 100 provided with an internal bore 102. A spool 104 is reciprocally received within the bore 102. One end of the bore 102 terminates in an enlarged diameter section 106 into which an end 108 of the spool 104 extends to mount a shoulder 110. A coil spring 112 is received within the enlarged diameter section 106 and abuts the shoulder 110. The coil spring 112 is retained in place by a threaded plug 114 which serves as a retainer for the spring 112 as well as a closure for the enlarged diameter section 106.

A port 116 extends from a side of the body 100 to the enlarged diameter section 106 and will be connected to the output of the main pump of the system. As a consequence of this construction, it will be appreciated that, as viewed in FIGS. 3 and 4, the spring 112 serves to urge the spool 104 toward the left. A similar urging force may be applied against the spool 104 by the application of pump pressure to the end 108 of the spool through the port 116. For isolation purposes, the spool 104 contains a land 118 immediately adjacent to the end 108 in sealing engagement with the bore 102.

As best seen in FIG. 3, the body 100 includes a further port 120 in fluid communication with the bore 102. The port 120 will be connected to a constant pressure source, for example, a pilot pump.

The spool 104 includes an annulus 122 which is normally aligned with the port 120, as illustrated in FIGS. 3 and 4, and immediately to the left thereof, as viewed in FIGS. 3 and 4, is a land 124 provided on both sides with metering slots 126. The bore 102 is provided with an annulus 128 in the vicinity of the land 124 and a port 130 in the body 100 extends to the annulus 128.

When the valve is utilized as a supply margin valve as, for example, in the circuit illustrated in FIG. 1, the port 130 will be connected to the control 12 of the pump 10. Conversely, when the valve is used as a demand margin valve as, for example, in the circuit illustrated in FIG. 2, the port 130 will be connected to the pilot valve 50.

In either event, depending upon the position of the spool 104, within the bore 102, the right-hand metering slots 126 in the land 124 will establish varying degrees of fluid communication between the port 120 and the port 130 or, in some instances, block fluid communication between those ports.

As viewed in FIG. 4, an additional port 132 is disposed in the body 100 just to the left of the port 130 and the port 132 will normally be connected to drain. The port 132 extends to an elongated chamber 134 within the body 100 which, as seen in FIG. 3, opens to both sides of the body 100 as at 136. Caps 138 are employed to close the chamber 134 so that all fluid received therein will be directed to the port 132 and to drain.

It will be observed that when the spool 104 is shifted to the right, as viewed in FIGS. 3 and 4, an increasing degree of fluid communication between the annulus 128 and the drain port 132 will be established by the left-hand metering slots 126 on the land 124 via the bore 102 and the chamber 134 for purposes to be seen.

The left-hand end of the spool 104, as viewed in the drawings, is tapered as at 140 and is disposed in a continuation 142 of the bore 102. A radially inwardly directed shoulder 144 separating the continuation 142 from the main part of the bore 102 serves to prevent fluid communication between the chamber 134 and the continuation 142.

Within the chamber 134, the spool 104 mounts a shoulder 146. As can be seen from FIGS. 3 and 4, the width of the shoulder 146 is considerably less than the left-to-right dimension of the chamber 134 so that the shoulder 146 may reciprocate therein along the longitudinal axis of the spool 104. The shoulder 146 includes a central aperture 148 in which the spool 104 is received and the spool is further provided with a peripheral slot 150 for receipt of a snap or spring retainer ring 152, also received in a slot 154 in the aperture 148 of the shoulder 146. Thus, the snap ring 152 serves to prevent relative movement between the shoulder 146 and the spool 104 along the longitudinal axis of the latter.

As best seen in FIG. 4, the top to bottom dimension of the chamber 134 is sufficiently close to that of the shoulder 146 so as to prevent any substantial degree of rotation of the shoulder 146 about the longitudinal axis of the spool 104 within the chamber 134. The purpose of this construction will appear hereinafter.

To assemble the shoulder 146 to the spool 104, the plug 114 is removed and the spool 104 withdrawn to the right as viewed in the drawings such that the tapered end 140 is disposed within the chamber 134. The snap ring 152 followed by the shoulder 146 are then disposed on the tapered end 140 with the taper serving to cam the snap ring 152 radially outwardly against its inherent resilience. The spool 104 is then shifted to the left until the snap ring 152 lodges within the slot 150 to firmly affix the shoulder 146 to the spool 104. The plugs 138 may then be installed along with the spring 112 and the plug 114. As a result, an extremely compact valve construction results in providing distinct size advantages as well as manufacturing economy.

As seen in FIG. 3, the body 100 includes a port 160 in fluid communication with the continuation 142 of the bore 102. The port 160 will typically be connected to the junction of the load or loads and their main control valves, such as the valves 16 or 44 shown in FIGS. 1 and 2. Thus, the end 140 of the spool 104 acts as a pressure responsive surface acting in bucking relation to the surface at the end 108 and the spring force applied by the spring 112.

The body 100 includes a pair of piston bores 162 which are parallel to the bore 102 and which extend from an end 164 of the body 100 to the chamber 134. Pistons 166 are disposed in the piston bores 162, which are located on opposite sides of the bore 102 for equalization purposes, and abut the shoulder 146. Thus, by application of a force to the pistons 166, an additional force may be applied to the spool 104 in bucking relation to that provided by the spring 112 and any fluid under pressure admitted to the port 116. In this connection, the dimensioning of the chamber 134, as mentioned previously, to prevent rotation of the shoulder 146 ensures that the shoulder 146 cannot rotate out of contact with the pistons 166.

The body 100 includes a feedback passage 170 connected to the annulus 128 to thereby be in fluid communication with the port 130. An end cap 172 is secured to the end 164 of the body 100 which is in fluid communication with the passage 170. A seal 178 is employed to seal the interface of the end cap 172 in the body 100 about the passages 170 and 176.

As seen in FIG. 3, the passage 176 opens to a bore 180 near the end cap which is normally closed, at one end, by a plug 182. From the bore 180, bores 184 establish fluid communication to the piston bores 162. The interface of the bores 162 and the bores 184 are sealed by seals 186.

The structure is completed by the provision of a small bleed passage 190 extending from the feedback passage 170 to the chamber 134 to provide a restricted flow outlet for fluid outlet for fluid trapped against the pistons 166 in the bores 162 to drain.

Operation of the valve is essentially the same whether utilized as a supply margin valve or as a demand margin valve and in the configuration illustrated, when used as a supply margin valve, is specifically intended for use with a pump of the type that will increase its output pressure in response to a decrease in signal pressure.

In operation, both pump pressure and spring pressure will be tending to urge the spool 104 to the left, as viewed in the drawings, to thereby increase flow from the port 120 to the port 130 and increase pressure in the port 130. At the same time, the load pressure, which normally will be less than the pump pressure, will be applied to the end 140 of the spool 104 to urge the same to the right. Similarly, the pressure at the port 130 will be applied to the pistons 166 to move the spool 104 to the right. Should the desired margin between load pressure and pump pressure be exceeded, the increasing force applied to the right-hand end of the spool 104 will result in a slight shifting of the spool 104 to the left thereby increasing the flow path from the port 120 to the port 130 to decrease the area through the left hand metering slots 126 in FIG. 4 and provide a higher fluid pressure to the control 12 for the pump 10 to thereby cause the same to decrease its output pressure. The resulting increase in pressure at the port 130 will be fed via the feedback passage 170 to the pistons 166 to increase the pressure tending to shift the spool 104 to the right to halt leftward movement and provide stability to prevent the spool 104 from chattering.

In the event the desired margin is not met, the load pressure acting on the end 140 of the spool 104 along with the feedback pressure acting through the pistons 166 will tend to move the spool 104 to the right. As a consequence, the flow path from the port 120 to the port 130 will be narrowed, causing a decrease in pressure in the port 130 and a decrease in the pressure applied to the control of the pump 112 thereby commanding the same to increase its output pressure. At the same time, the decrease in pressure at the port 130 will result in a lesser total pressure being exerted against the spool 104 by the pistons 166 to terminate such movement and at the same time prevent chattering and valve instability.

Typically, the effective pressure responsive surface at the end 108 will be equal to that at the end 140. In addition, the pressure responsive surface of the pistons 166 will typically be equal in effective size to the effective size of the end 108 or the end 140. If the pressure applied by the spring 112 is then selected to be equal to the lowest pressure of the regulation spread of the pump control 12, the regulation spread being that range of pressures whose minimum and maximum values, when applied to the pump control 12, will cause the pump to change between maximum stroke and minimum stroke, or vice versa, then the ratio of the area of the end 108 to the total effective areas of the end 140 and the pistons 166 will be as the ratio of the regulation spread to the margin. With this situation, the margin will then be equal to approximately twice the regulation spread of the pump control 12.

Of course, other values may be used as desired, but in any event, it will be appreciated that the margin will remain constant for all discharge pressures of the pump 10.

Figure 5:
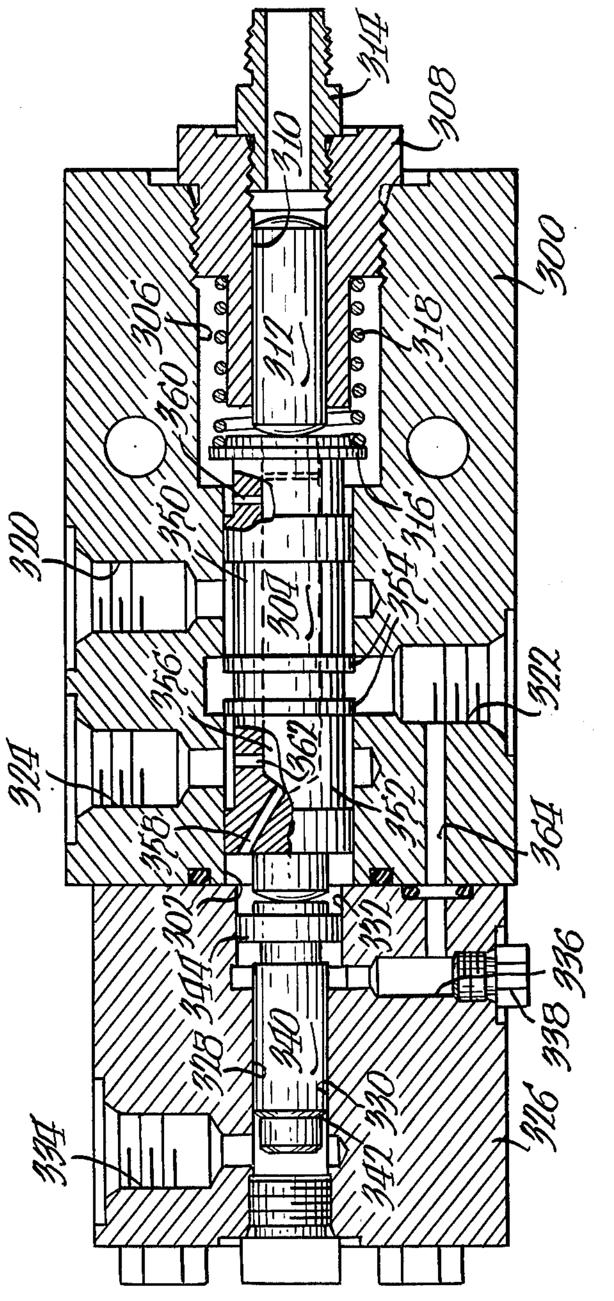
FIG. 5 is a sectional view of a modified embodiment of a valve made according to the invention.

A modified embodiment of a valve made according to the invention is illustrated in FIG. 5 and is seen to include a valve body 300. The body is provided with a bore 302 which slidably receives a spool 304. One end of the bore 302 includes an enlargement 306 which opens to the exterior of the body and is tapped to receive a plug 308. The plug 308 includes a piston bore 310 receiving a piston 312 and is also tapped so as to receive a fitting 314. The fitting 314 is adapted to be connected to the pump discharge as, for example, by the line 22 (FIG. 1) or the line 60 (FIG. 2) so that pump discharge pressure may be applied to the piston 312 which, in turn, abuts the right-hand end of the spool 304 to provide a biasing force thereagainst.

The right-hand end of the spool 304 is also provided with a shoulder 316 and a spring 318 is interposed between the shoulder 316 and the plug 308. Consequently, the spring 318 applies a leftward biasing force to the spool 304 in concert with any force applied to the spool 304 by the piston 312.

A port 320 opens to the bore 302 and is adapted to be connected to the pilot pump. A port 322 opens to the bore 302 in spaced relation to the port 320 and is adapted to be connected to the pump control 12 when the valve is used as a supply margin valve or to the pilot valve 50 when the valve is used as a demand margin valve. A further port 324 opens to the bore 302 and is spaced from both ports 320 and 322 and is connected to drain.

An end cap 326 is suitably secured by means (not shown) to the left-hand side of the body 30 and seals are utilized where indicated. The end cap 326 includes a stepped bore 328 having a first diameter 330 and a second diameter 332. As illustrated in the drawings, the diameter 320 is lesser than the diameter 332.

A port 334 extends to the diameter 330 and is adapted to be connected to the system load as, for example, by either the line 24 (FIG. 1) or the line 62 (FIG. 2). A second port 336 is in fluid communication with the second diameter 332 and is plugged by a plug 338.

A stepped piston 340 is received within the bore 328 and includes an end 342 which seals against the first diameter 330 and which may be subjected to fluid under pressure applied thereto via the port 334. At its opposite end, the stepped piston 340 includes a shoulder 344 which sealingly, slidingly engages the second diameter 332 and which may be subjected to fluid pressure at the port 336. The stepped piston 340 further abuts the left-hand end of the spool 304 so that fluid under pressure, applied either to the end 342 or to the shoulder 344, or both, will provide a rightward biasing force to the spool 304.

Returning to the spool 304, the same includes a groove 350, nominally aligned with the port 320 and a groove 352 nominally aligned with the port 324. Land 354 are located in the vicinity of the port 322 and it will be appreciated that as the spool 304 moves to the left, fluid communication from the port 320 to the port 322 will become established in varying degrees while fluid communication between the port 322 and the port 324 will be cut off in varying degrees. Rightward movement of the spool 304 will produce the opposite action and, as those skilled in the art will appreciate, the lands 354 serve to meter flow.

The interior of the spool is hollow as at 356 and a conduit 358 extends from the hollow center 356 toward the left-hand end of the bore 302 to be in fluid communication with the right-hand side of the shoulder 344.

A radial port 360 adjacent to the right-hand end of the spool 304 is in fluid communication with the enlargement 306 and with the hollow center 356 of the spool and a similar radial port 362 extends from the center of the spool to the groove 352. As a consequence, fluid within the enlargement 306 or against the right-hand side of the shoulder 344 will be continually vented to drain through the port 324 connected to drain. A feedback passage 364 extends from the port 322 to the port 336 to complete the essential details of the valve illustrated in FIG. 5.

In general, the effective area of the piston 312 subjected to pump discharge pressure will be equal to the effective area of the end 342 of the stepped piston 340 subjected to load pressure. The effective area of the shoulder 344 will be equal to both. And, the spring 318 may be selected to provide a pressure equal to the pressure at the lower end of the regulation spread utilized. Those skilled in the art will readily recognize from the foregoing description of the operation of the valve illustrated in FIGS. 3 and 4, the manner of operation of the valve of FIG. 5 which performs substantially identically thereto and provides a constant margin in a supply margin system irrespective of pump discharge pressure.

Of course, it is to be understood that the foregoing dimensioning of the pressure responsive surfaces is exemplary only, although preferred, and that a variety of other surface area ratios and spring forces other than those mentioned may be employed as system requirements dictate.

If it is desired to use the valve as a supply margin valve with a pump of the type that will increase its output pressure in response to an increase in signal pressure, it is only necessary in either version to interchange the pump and load signals so that the pump signal opposes the spring force and the load signal adds to the spring force, and adjust the level of spring force to fit the new condition.

It will also be appreciated that valves made according to the invention provide excellent stability, thereby allowing fine control over loads in the systems in which the valves are utilized.

The embodiments of the invention in which an exclusive property or privilege is claimed are defined as follows:

1. A margin valve for use in hydraulic systems having at least one load provided with hydraulic fluid under pressure by a main pump, and a pilot pump and at least one control valve for the load, said margin valve comprising:

a valve body having a bore;

a spool reciprocally received in said bore;

a first port in said body extending to said bore and adapted to be connected to a pilot pump;

a second port in said body extending to said bore in spaced relation to said first port and adapted to a component of a hydraulic system other than a pilot pump;

a spring in said valve body for applying a biasing force to said spool to urge the spool in one direction within said bore;

means, including a third port in said body adapted to be connected to a main pump, for applying a force to said spool to urge said spool in said one direction;

means, including a fourth port in said body adapted to be connected to a load, for applying a force to said spool in bucking relation to said spring; and means, including a feedback passage in fluid communication with said second port, for applying an additional force to said spool in bucking relation to said spring.

2. The margin valve of claim 1 wherein said fourth port and said feedback means comprise a stepped member slidable within said bore, said fourth port being in fluid communication with one surface of said stepped member and said feedback passage being in fluid communication with another surface on said stepped member.

3. The margin valve of claim 2 wherein said stepped member is separate from said spool and is engageable with one end of said spool to apply said bucking forces.

4. The margin valve of claim 1 wherein one of said fourth port and said feedback passage means comprises an end of said spool and the other includes a cross member on said spool abutted by fluid responsive pistons on opposite sides of said spool.

5. The margin valve of claim 4 further including a restricted flow bleed passage in fluid communication with said feedback passage.

6. The margin valve of claim 4 wherein said body includes a chamber having an opening on at least one side of said body and intersecting said bore, said chamber being dimensioned to freely receive said cross member through said opening, and means for closing said opening.

7. The margin valve of claim 6 further including a fifth port in said body adapted to be connected to a drain and in fluid communication with said chamber; and a restricted flow bleed passage interconnecting said chamber and said feedback passage.

8. The margin valve of claim 7 wherein said spring abuts an end of said spool opposite said one end and is received in an enlarged bore in said body generally coaxial with said first-named bore; means for closing said enlarged bore and for retaining said spring therein; and an end cap secured to said body oppositely of said enlarged bore and closing said bore adjacent said spool one end.

9. The margin valve of claim 6 wherein said spool end is tapered and wherein said cross member includes an aperture receiving said spool, said cross member being held against movement relative to said spool by a snap ring introduced onto said spool tapered end through said chamber.

10. The margin valve of claim 6 wherein said chamber is shaped to restrict rotary movement of said cross member about the longitudinal axis of said spool.

11. The margin valve of claim 1 wherein said feedback passage is formed in said body.

12. The margin valve of claim 1 wherein third port and fourth port means each include pressure responsive surfaces mechanically linked to said spool in bucking relation with each other.

13. The margin valve of claim 12 wherein said pressure responsive surfaces are of substantially equal effective size and wherein said feedback passage means includes a pressure responsive surface substantially equal to said effective size.

14. A hydraulic system including the margin valve of claim 1 acting as a supply margin valve, said system including a main, variable displacement pump having a hydraulically operated control; a load; a control valve interconnecting said main pump and said load and a pilot pump; said pilot pump being connected to said first port; said main pump being connected to said third port; said second port being connected to said main pump control and said fourth port being connected to said load at its junction with said control valve.

15. A hydraulic system including the margin valve of claim 1 acting as a demand margin valve, said system including a main pump, a pilot pump, a load, a pilot operated valve interconnecting said main pump and said load and a pilot valve connected to said pilot operated valve and to said second port, said first port being connected to said pilot pump, said main pump being connected to said third port, and said fourth port being connected to the junction of said load and said pilot operated valve.

16. A valve comprising:

a valve body having a spool bore opening in at least one end of the body;

a spool received in said spool bore and having a tapered end;

ports in said body and extending to said spool bore;

a piston bore in said body and generally parallel to said spool bore and opening to said chamber;

a shoulder having an aperture receiving said spool within said chamber and having a portion aligned with said piston bore, said shoulder being sized to be introduced into said chamber through said opening;

a snap ring securing said shoulder on said spool and introduced onto said spool at said tapered end;

a piston in said piston bore and abutting said shoulder; and separate means for directing fluid to said tapered end and to said piston.

17. The valve of claim 16 wherein said chamber and said shoulder are dimensioned to prevent substantial rotation of said shoulder within said chamber.

18. A valve comprising:

A valve body having a bore;

port means in said body extending to said bore;

a spool having at least one land and one groove slidably received in said bore;

a stepped bore having two differing diameters in said body generally coaxial with said bore;

a stepped piston having two differing diameters corresponding to respective ones of the stepped bore diameters within said stepped bore and engaging an end of said spool;

a first conduit in said body connected to one diameter of said stepped bore;

a second conduit in said body connected to another diameter of said stepped bore.

19. The valve of claim 18 wherein one of said conduits comprises a feedback passage from one of said port means.

20. A margin valve for use in hydraulic systems having at least one load provided with hydraulic fluid under pressure by a main pump, and a pilot pump and at least one control valve for the load, said margin valve comprising:

a valve body having a bore;

a spool reciprocally received in said bore;

a first port in said body extending to said bore and adapted to be connected to a pilot pump;

a second part in said body extending to said bore in spaced relation to said first port and adapted to a component of a hydraulic system other than a pilot pump;

margin establishing means in said valve body;

means, including a third port in said body adapted to be connected to a main pump, for creating a force tending to urge said spool in one direction;

means, including a fourth port in said body adapted to be connected to a load, for creating a force tending to urge said spool in opposition to said third port means; and means, including a feedback passage in fluid communication with said second port, for creating an additional force tending to urge said spool within said bore.

21. A fluid control system comprising:

a fluid pump;

a work element;

a control valve for communicating fluid flow from said pump to said work element;

a pressurized fluid source;

movable valve means for receiving pressurized fluid from the fluid source and delivering a modified pressure therefrom;

a first means for creating a first moving force on said valve means in response to a pressure signal from the fluid pump;

a second means for creating a second moving force on said valve means in response to a pressure signal from the work element, delivering a modified pressure from said valve means;

a feedback means for creating a third moving force on said valve means in conjunction with said second means and being responsive to said modified pressure to further modify said modified pressure relative to said pump and load signals.

* * * * *

Disclaimer 4,196,588.—*Howard L. Johnson,* Joliet, Ill. MARGIN VALVE. Patent dated Apr. 8, 1980. Disclaimer filed Oct. 13, 1981, by the assignee, *Caterpillar Tractor Co.*

Hereby enters this disclaimer to claims 1 and 20 of said patent.

[*Official Gazette June 15, 1982.*]